Patented Jan. 18, 1927.

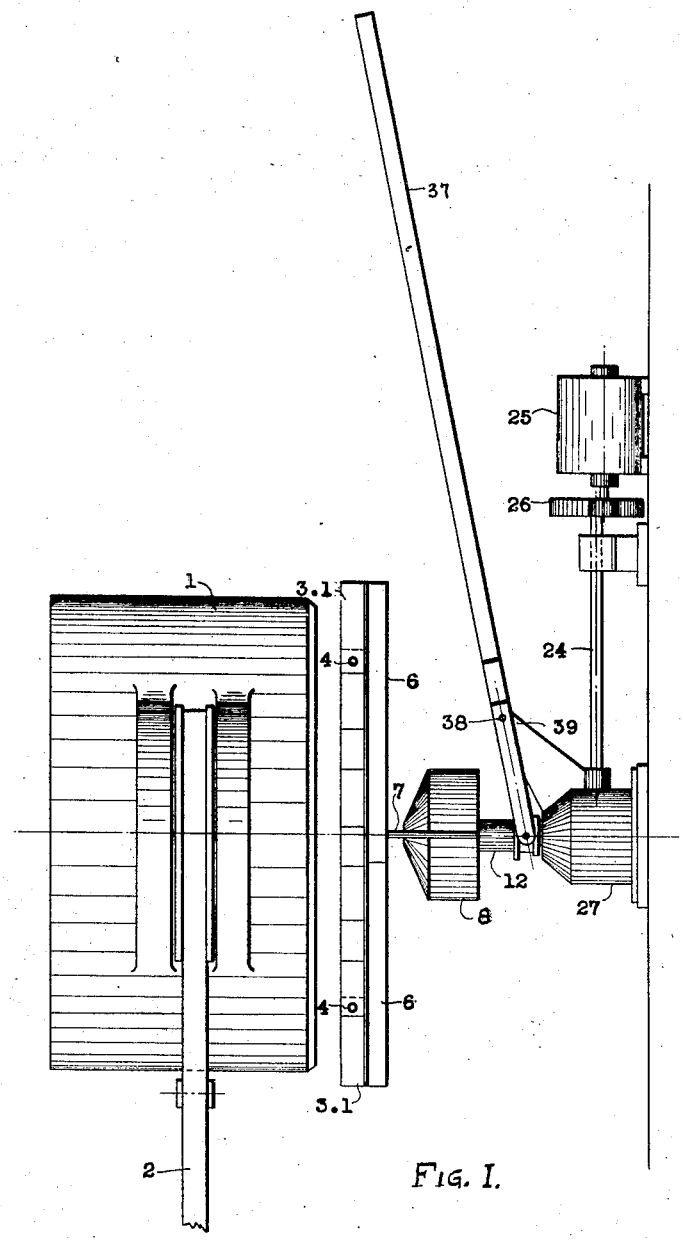

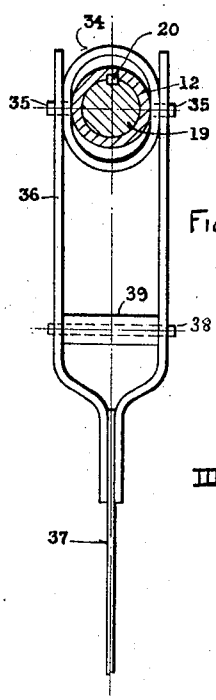
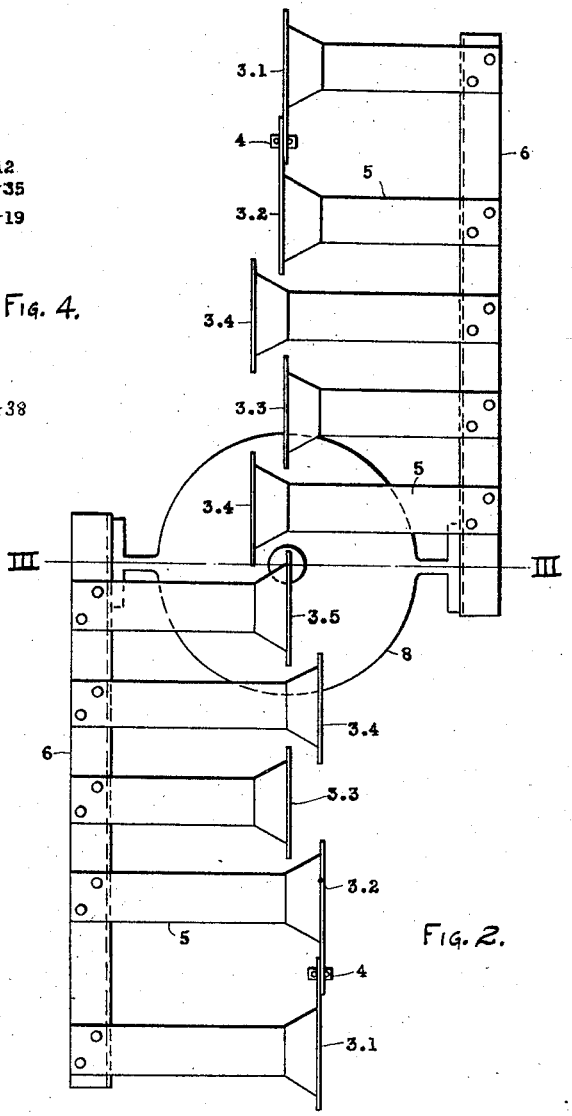

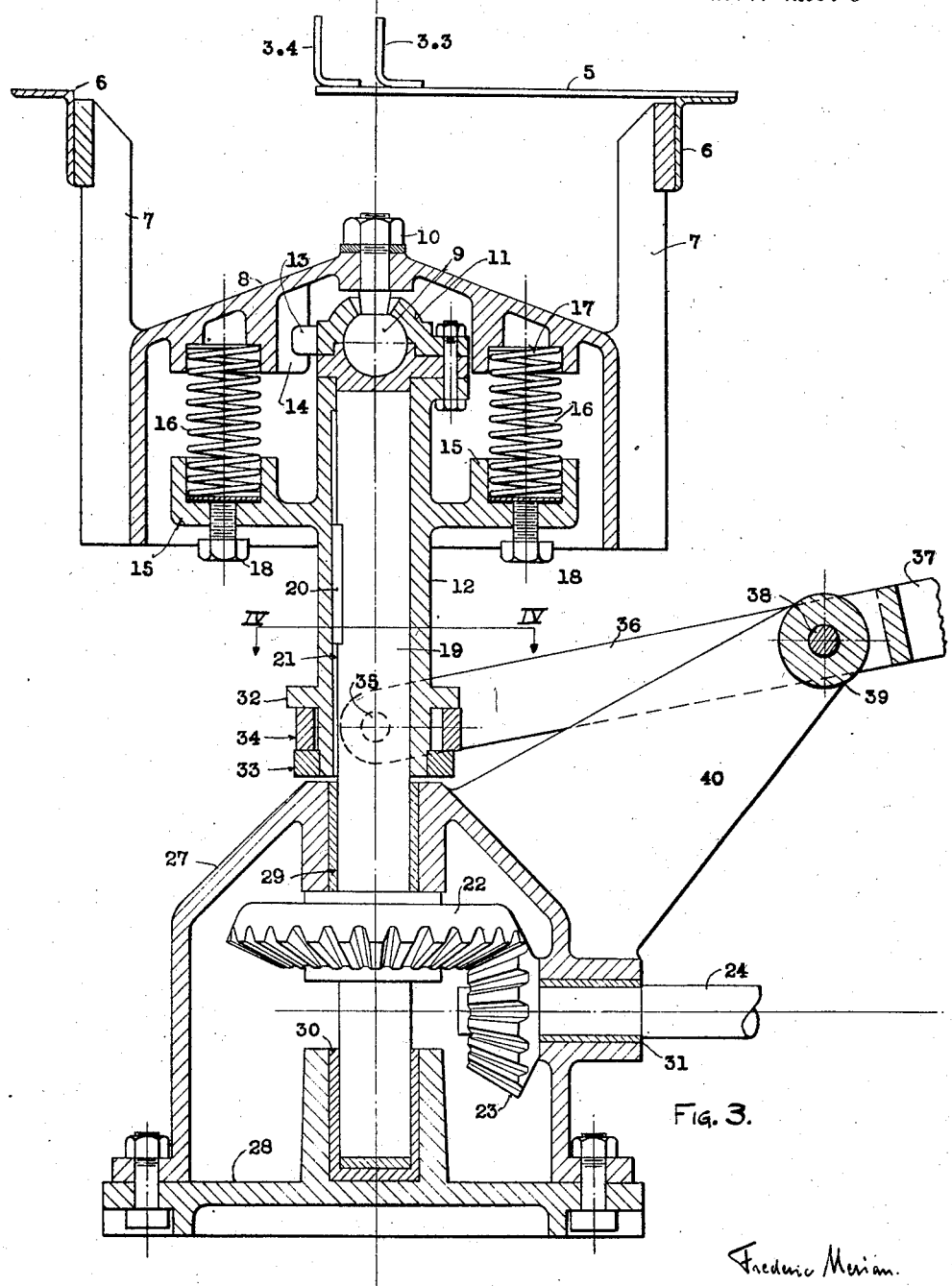

1,614,928

UNITED STATES PATENT OFFICE.

FREDERIC MERIAN, OF PITTSBURGH, PENNSLYVANIA, ASSIGNOR TO J. W. CRUIKSHANK ENGINEERING COMPANY, OF PITTSBURGH, PENNSYLVANIA.

CLEANING THE BOTTOMS OF CRUCIBLES OR CLAY POTS.

Application filed September 16, 1922. Serial No. 588,687.

These pots are used principally in the plate glass industry. The glass is melted in the pots in furnaces from which they are removed for the purpose of pouring the molten glass on the casting table where it is rolled into a sheet. It is obvious that it is necessary that all foreign matter be excluded from the glass as it is poured on the table and for this reason the bottoms of the pots have to be cleaned to remove any particles that might drop off from them during the pouring operation. When in the furnace the pot rests on a clay surface to which it has a tendency to adhere, due to the glass which escapes from the pot. In order to prevent this adhesion fine coal, coke or some form of carbon is spread over the seat of the pot in the bottom of the furnace, some of this coal adheres to the pot bottom and is very liable to drop off, and must be removed. There is another reason for cleaning the bottom of the pot in that pieces of slag or glass should be knocked off, to even up the bottom so that these lumps will not destroy and break up the surface of the "siege" or clay bottom of the furnace when the pot is reset.

The bottom of these pots are usually cleaned by hand, a man using a scraper similar to a hoe which is an arduous task and cannot be done in a thorough and efficient manner. My machine will also do the work in a much more expeditious manner than by hand which is important as it is advisable to get the pot to the casting table as soon as possible before the glass begins to cool and a skin is formed on its surface.

The precise nature of my invention will be better understood by reference to the accompanying drawings of which:—

Fig. 1. is an elevation of the machine showing the clay pot held by tongs above it.

Fig. 2 is a plan view of the machine showing the scrapers.

Fig. 3 is an enlarged section on line III—III, Fig. 2.

Fig. 4 is a detail section on line IV—IV, Fig. 3.

In the drawings 1 represents a clay pot held in the usual tongs 2 in transit from the furnace to the casting table. Scrapers marked respectively 3.1, 3.2, 3.3, 3.4 and 3.5 are mounted on spring steel bars 5 which are carried on angle bar arms 6. Scrapers 3.1 and 3.2 are respectively loosely connected by pins 4. The arms 6 are bolted to arms 7 of a rotating drum 8. This drum is supported on a ball member 9 secured by a nut 10. The ball 9 is supported in a socket 11 attached to the top of a sleeve 12. The socket cap 11 has an arm 13 which projects between flanges forming a groove 14 in the drum 8. Sleeve 12 is provided with four arms 15 which have seats for springs 16, the other end of the springs resting in seats 17 in rotating drum 8. Screws 18 are provided to increase the respective compression of the springs 16. The sleeve 12 is mounted on a vertical shaft 19 in which there is a feather key 20 engaging a keyway 21 in the sleeve 12 so that it can slide on the shaft 19, but must revolve with it. The shaft 19 is driven by a bevel gear 22 meshing with a bevel pinion 23 fastened to a horizontal shaft 24. This in turn is driven by a motor 25 through a pair of gears 26. A housing 27 and a base plate 28 are arranged with bearings 29 and 30 for the vertical shaft 19 and with bearing 31 for the horizontal shaft 24.

The sleeve 12 is provided with a flange 32 and a collar 33 between which is mounted a ring 34 having laterally extending pins 35 which engage the forked arms 36 of the lever 37. This lever pivots on a fulcrum pin 38 mounted in the boss 39 on the bracket 40 attached to the housing 27.

The operation is as follows:—The pot 1 is brought over the pot cleaning machine in the position indicated in Fig. 1. The motor 25 is put in operation rotating the drum 8 carrying the arms 6 with the scrapers 3. The operator depresses the end of the lever 37, raising the sleeve 12 until the scrapers 3 engage with the bottom of the pot, and pressure is applied until all the loose material is removed. In the scraping action the springs 5 allow those scrapers, coming in contact with projections on the pot bottom to deflect sufficiently so that the others can follow the outline of any depression of the surface and thus an uneven surface is scraped thoroughly. The flat springs can also twist so that the scrapers will follow the contour of any raised or depressed irregular surface. In case the outside scraper 3.1 should leave the pot surface at its periphery when cleaning a small pot or due to relative eccentricity of the pot and the machine the scrapers 3.1 and 3.2 art loosely fastened together by the pin 4 so that the scraper 3.2 will depress the edge of the scraper 3.1 sufficiently so that it can easily return to the surface of the bottom of the pot. The springs 5 are made alternately long and short so that the scrapers can overlap and every part of the surface of the pot will be scraped, moreover it will also be noted that the scraper 3.5 overlaps the center of the machine so that every portion of the bottom surface of the pot is scraped when the arms carrying the scrapers are given a motion of rotation. When the pot is suspended and carried by the tongs as shown, the bottom will seldom be in exactly a horizontal plane, this is immaterial as the arms 6 carrying the scrapers 3 can adjust themselves to a plane deviating from the horizontal by the freedom of the drum 8 to pivot on the ball 9 in the socket 11. The springs 16 are provided so that the arms 6 will tend to resume a horizontal position.

Thus it is evident that every part of the bottom of a pot will be thoroughly scraped irrespective of the irregularities of its surface or the deviation of the bottom from a horizontal plane.

I claim:—

1. In a machine for cleaning melting pot bottoms, a plurality of scrapers resiliently mounted on oppositely horizontally extending arms, means for yieldingly mounting said arms, means to revolve the arms, the said arms being rotatably mounted for movement in a horizontal plane and slidably mounted for linear movement in a vertical direction, means to raise the arms and scrapers vertically so that the scrapers will contact with pressure on the lower surface of the pot.

2. In a machine for cleaning melting pot bottoms, the combination of a plurality of scrapers mounted on horizontally extending arms rotatively mounted, the scrapers being alternately placed with their path of travel overlapping in concentric circles and covering the entire bottom surface of the pot during their revolution.

3. In a machine for cleaning melting pot bottoms, a plurality of scrapers resiliently mounted on oppositely horizontally extending arms, the said arms being rotatably mounted for movement in a horizontal plane and slidably mounted for linear movement in a vertical direction, means to revolve the arms, means to raise the arms and scrapers vertically so that the scrapers will contact with the lower surface of the pot, means for loosely connecting the outermost scrapers to the next adjoining scrapers whereby the depression of one is transmitted to the other.

4. In a machine for cleaning melting pot bottoms, the combination of a vertically disposed shaft, means for rotating said shaft, a sleeve slidably mounted on said shaft and rotating therewith, a drum mounted on said sleeve for limited universal movement and rotating therewith, oppositely extending arms mounted on said drum, scrapers carried by the arms, and resilient connections between said drum and said sleeve whereby the arms when idle are retained in a substantially horizontal plane.

5. In a machine for cleaning melting pot bottoms, the combination of a vertical shaft, means for rotating said shaft, a sleeve slidably mounted on said shaft and rotating therewith, a drum mounted on said sleeve for limited universal movement, arms extending from the drum, resilient bars extending from said arms, scrapers mounted on the free ends of said resilient bars, and means for elevating the sleeve to bring the scrapers into individual contact with the pot bottom.

6. In a machine for cleaning melting pot bottoms, the combination of a sleeve slidably mounted on a vertical shaft, means for rotating said member and independent means for moving said member on its vertical axis, arms extending oppositely and outwardly rigidly connected to said member, scrapers resiliently carried by said arms so that said scrapers are held in resilient contact with the pot bottom.

7. In a machine for cleaning melting pot bottoms, the combination of a rotary support, a sleeve slidably mounted on said support and rotating therewith, a drum mounted on said sleeve and rotating therewith, arms extending laterally and rigidly connected to said drum, scrapers resiliently carried by said arms, means for maintaining said scrapers in contact with the pot bottom.

FREDERIC MERIAN.